United States Patent [19]

MacMillan

[11] Patent Number: 4,581,089

[45] Date of Patent: Apr. 8, 1986

[54] GLAZING SYSTEM AND METHOD OF INSTALLATION

[75] Inventor: Douglas R. MacMillan, Yorba Linda, Calif.

[73] Assignee: Guardian Industries Corp., Northville, Mich.

[21] Appl. No.: 660,146

[22] Filed: Oct. 12, 1984

[51] Int. Cl.[4] .......................... B32B 31/00; C09J 5/00

[52] U.S. Cl. ...................................... 156/267; 49/380; 52/98; 52/167; 52/208; 52/745; 52/781; 156/257; 156/289; 156/293; 156/305; 160/87; 160/368 R; 264/138; 264/261; 264/264

[58] Field of Search ............... 156/109, 289, 257, 293, 156/267, 305; 52/167, 745, 208, 781; 264/261, 264, 138; 160/87, 368 R; 52/98; 49/380

[56] References Cited

U.S. PATENT DOCUMENTS 2,848,761 8/1958 Hahn ..................................... 52/208

3,872,198 3/1975 Britton ................................ 156/109

*Primary Examiner*—John J. Gallagher

*Attorney, Agent, or Firm*—Cullen, Sloman, Cantor, Grauer, Scott and Rutherford

[57] ABSTRACT

An improved glazing system wherein glass panels are secured to a frame member in an edge-to-edge sealed relationship. A first glass panel is bonded to a frame member such as a vertical mullion using a sealant which adheres to the edge of the first glass panel and to the face of the first glass panel adjacent the edge. A portion of the frame is removed to expose a section of the bonded sealant and thereafter a second glass panel is positioned on the sealant such that the two glass panels are in an edge-to-edge, sealed relationship. The edge to edge abutting relationship of the panels may be accomplished without the need for caulking or exterior access to the glass panels.

12 Claims, 4 Drawing Figures

GLAZING SYSTEM AND METHOD OF INSTALLATION

BACKGROUND OF THE INVENTION

This invention relates to glazing systems and, more particularly, to an improved glazing system which allows for pre-glazing of a glass panel to a frame member, such as a mullion, at the factory thereby reducing the time, effort and expense involved in the installation of the glass panel during construction of a building.

Prior to the present invention, when glass panels were to be installed in an abutting side-by-side relationship, the panels of glass were typically installed in opposed C-shaped channels of vertical mullions. This required caulking of the panels in the channels using an adherent sealant, during construction of the building and, in addition, required access to the exterior of the glass panels. Access to the exterior of the glass panels, however, especially in connection with high rise office buildings, required scaffolding techniques which are both expensive and time consuming. Furthermore, the labor of skilled glaziers at the job location was often required.

The present invention overcomes these shortcomings by providing a new and improved glazing system where the glass panels are pre-glazed to vertical mullions or the like so that the entire glazing system may be easily and conveniently installed at the job location without the need for access to the exterior of the panels and without the need for caulking at the job location.

SUMMARY OF THE INVENTION

The present invention provides an improved approach to multi-panel glazing systems wherein a glass panel is pre-glazed at the factory to the vertical mullion. The glazing is accomplished through the use of flexible, adherent sealant joint which bonds the vertical mullion to the face of the glass panel, along the edge, with the joint further extending around the edge of the glass panel such that when the adjacent glass panel is positioned in an edge-to-edge relationship with the first glass panel, the resilient joint receives the second panel and a complete seal is formed between the mullion and the two panels.

The present invention further includes an improved glazing method wherein a portion of the vertical mullion is used as a molding cavity into which the flexible joint material is flowed. The flexible joint material, as it cures or hardens, bonds the glass panel to the mullion. Thereafter, a portion of the cavity is broken off and discarded thus exposing a second portion of the flexible joint to receive the second glass panel.

BRIEF DESCRIPTION OF THE DRAWINGS

The various benefits and advantages of the present invention will become more apparent upon reading the following detailed description of the invention taken in conjunction with the drawings.

In the drawings, wherein like reference numerals identify corresponding components.

DETAILED DESCRIPTION OF THE INVENTION

Figure 1:
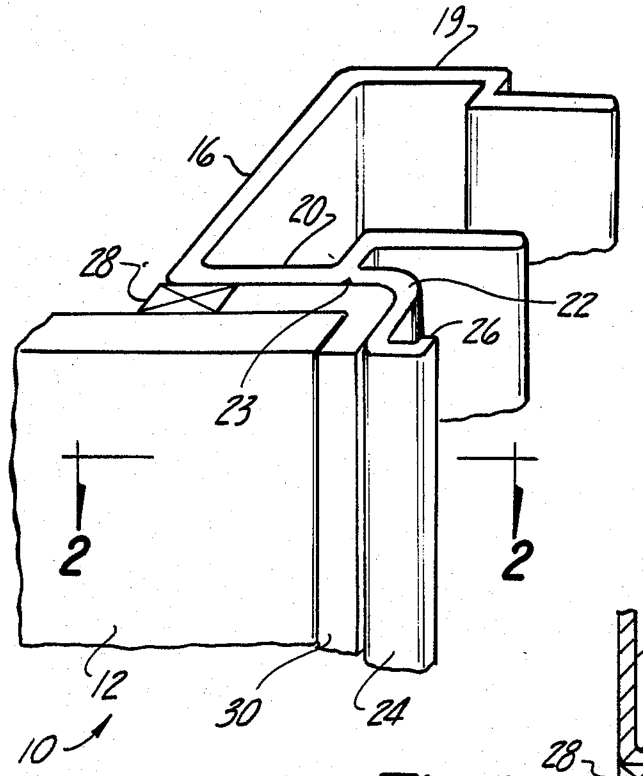
FIG. 1 is a perspective illustration of a channel, a portion of a glass panel, and the flexible joint according to the principles of the present invention.

With reference to the drawings, the improved glazing system of the present invention will first be explained in the context of side-by-side glass panels and vertical mullions. It should be appreciated and understood, however, that the present invention may also be utilized in connection with upper and lower abutting glass panels and an associated horizontal frame member. The glazing system 10 of the present invention is illustrated as including a pair of glass panels 12, 14, called lites, which are adapted to be placed in a sealed, side-by-side relationship, i.e., with the edges 13, 15 of the panels 12, 14, respectively, in an abutting relationship as distinguished from the panels being in a face to face relationship. The system includes a plurality of generally C-shaped aluminum extrusions 16, 18 with each extrusion including a base and a pair of opposed legs 19, 20. The extrusions 16, 18 may each be thought of as vertical mullions.

According to the principles of the present invention, one leg 20 of the vertical mullion or extrusion is provided with a frangible extension 22. The extension may be integrally extruded as part of the mullion and, since it is ultimately desirable to remove the extension, a notch 23 may be formed at the extension 22 where the extension joins the extrusion leg 20. The extension is generally Z-shaped from the notch 23 outwardly away from the extrusion and terminates in a flange 24 generally parallel to both the extrusion leg 20 and the first part of the extension. The flange 24 may be provided with a protrusion or nib 26 to facilitate securing and breaking the extension 22 free of the extrusion leg 20.

When the glazing system is pre-assembled at the factory, the glass panel 12 is placed adjacent the extrusion leg 20 and spaced apart therefrom and also spaced apart from the extension 22. A tape or sealant 28, such as Norton 2100 tape is provided between the glass panel the corner of the extrusion 16. This tape is neoprene and functions as a sealing gasket.

The extrusion and glass panel are positioned such that the face of the glass panel is in a horizontal plane and a cavity is defined between the glass panel, the extrusion leg 20 the extension 22. A parting agent such as wax or the like is placed on the interior surfaces of the extension leg 22, i.e., the portion of the surface which would face the interior of the cavity. Then a sealant 30 is flowed into the cavity. The sealant is preferably Dow Corning 982 sealant which is a silicon sealant. As the sealant cures, the sealant bonds or adheres to the panel 12, the gasket 28 and the mullion or channel leg 20, and forms an L-shaped member (in plan view) which results in the panel 12 being glazed to the extrusion. Specifically, the face of the panel 12, adjacent edge 13, is glazed to the leg 20 of the extrusion and a flexible silicon joint is provided therebetween, with part of the joint extending along edge 13 of the panel consequently, the sealant is of nonuniform thickness along the edge of the panel.

The opposite edge of the panel, i.e., the edge of the panel which is not bonded to the sealant 30, may be provided with rectangular joint 32 (as illustrated at edge 15 of glass panel 14 in FIG. 3), rather than an L-shaped joint 30 and the second extrusion 18 may be secured thereto. That is, the opposite end of the panel 12 may be bonded to an extrusion 18 using a rectangular rather an L-shaped joint. A sealing gasket 28 is also provided between the glass, the frame and the sealant 32. In this fashion both edge faces of the panel will be bonded to the respective frame members.

Subsequent to curing the sealant, it is necessary to break away the extrusion extension 22 such as by grabbing the flange 24 or the nib 26 with pliers and tending to rotate the extension about the notch 23 thus causing the extension to break away from the extrusion leg 20. Because of the use of the parting agent as previously described, the extension 22 will break cleanly from the L-shaped, cured sealant 30 thus leaving the sealant exposed. The glass panel 12 with vertical extrusions bonded to each end, may be shipped to the final destination. Then, to assemble the glass panels in a side-by-side, sealed relationship, the second panel 14 (together with its associated vertical mullion or extrusion 18 is moved toward the sealant 30 and into contact therewith. The sealant has a certain degree of resiliency, even after curing, such that a good, seal may be effected between the second panel 14 and the sealant 30 by pushing the extrusion 18 toward the extrusion 16. The two extrusions are provided with an interlocking connection (not shown) as is common (for other purposes) as well as a neoprene gasket 33 therebetween and advancing the extrusions 16 and 18 toward each other slightly compresses the sealant 30 between the panels to thus provide the desired finished product.

It should be appreciated that the present invention, by pre-glazing the vertical mullion on the edge of the glass, provides a reduction in labor and materials used in the fabrication of the system and, of course, no exterior access to the system is required during installation. Furthermore, it is not necessary to caulk the edges of the panels during installation of the system in a building.

Figure 2:
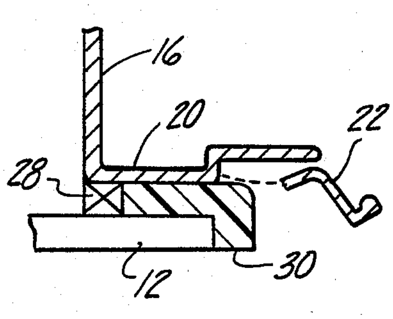
FIG. 2 is a partial sectional view as seen in the direction of arrows 2—2 of FIG. 1 with a portion of the molding cavity broken off.
Figure 3:
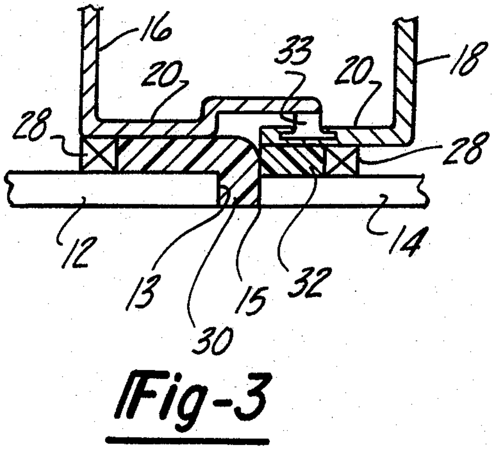
FIG. 3 is a sectional view of two adjacent panels and the frames associated with each in an assembled position.
Figure 4:
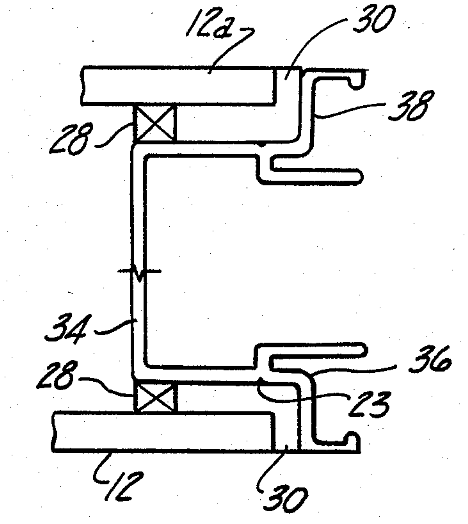
FIG. 4 is a plan view of the glazing system of the present invention where sealed, insulated, double glazed glass panels are utilized.

The invention as described in the context of FIGS. 1, 2 and 3 envisions a pair of side-by-side (or up and down) glass panels. FIG. 4 contemplates a glazing system where each "panel " is actually an insulated, double glass type of system including a pair of opposed glass panels 12, 12*a* on opposite sides of an extrusion 34. Extrusion 34 will be provided with two break-away extensions 36, 38, each of which corresponds to the extension 22 of FIGS. 1–3. If a dual glass system such as the type diagrammatically illustrated in FIG. 4 is utilized, then the vertical mullion 34 is glazed to the opposed panels 12, 12*a* and a suitable seal is provided around the periphery of the glass panels system and any air therein is evacuated according to conventional techniques for providing sealed insulated double glass panels.

The present invention includes several additional features. First, the side-by-side assembly withstands seismic movements. Consider a prior art system with two lites or glass panels butt glazed to the same mullion. In the event of seismic movement, since the spaced-apart mullions will not necessarily move in tandem, there is a resulting twisting or shear which causes the glass to shatter. With the present system, mullions 16 and 18 can move vertically relative to each other, without loss of seal, and thus an individual lite and its two mullions can move vertically relative to the adjacent lites and their mullions. Also, after such seismic movement, it is not necessary to recaulk.

Another feature of the present invention is the ability to accomodate glass panels that are not "perfect" rectangles. By way of example, during fabrication a preferred first step is to align edge 15 of lite 14 with the edge of mullion 18 and then bond them together with sealant 32. Edge 13 of the same lite, which is to be bonded to a mullion 16 with an "L"-shaped sealant 30 may not be truly parallel to edge 15 because of tolerance conditions during the manufacture of the glass. Thus instead of aligning mullion 16 and edge 13, mullion 16 is aligned parallel to mullion 18 (for the same lite) and any out of tolerance in the width of the lite, from top to bottom, is accommodated when forming and curing the sealant 30 because the width of the sealant 30 along the edge 13 need not be constant between the top and bottom of the assembly. Thus variations in the width of sealant 30 compensates for uneven or lack of parallel lite conditions.

The foregoing is a description of the preferred embodiment of the present invention. Various changes and modifications may be accomplished without departing from the spirit and scope of the invention. The invention, therefore, should be limited by the following claims:

What is claimed is:

1. A method of securing a glass panel to a first frame including a frangible portion such that a second glass panel may be sealed in an edge-to-edge abutting relationship relative to said first glass panel comprising the steps of:

positioning the face of a first glass panel, adjacent the edge thereof, in proximity to said first frame;

flowing an adherent sealant between said panel, said first frame and said frangible portion;

said step of flowing the adherent sealant including flowing the adherent sealant along the edge of the first glass panel;

curing said adhering sealant sufficiently to prevent further flowing thereof such that the glass panel is bonded to said first frame; and, removing said frangible portion of said first frame after the curing of said sealant.

2. The invention as defined in claim 1 wherein said sealant after hardening is of generally L-shaped configuration covering both the edge of said panel and the face of said panel adjacent the edge of the panel.

3. The invention as defined in claim 1 including securing said second glass panel to a second frame.

4. In a glazed wall system of the type including at least one frame member and first and second glass panels adapted to be secured in an edge-to-edge sealed relationship, the improvement comprising:

the frame member including an extension, said frame member, said extension and the first glass panel being arranged to define a cavity into which the sealant may be flowed and thereafter hardened to bond the sealant to both the face and said edge of the first glass panel;

the sealant being bonded to both said frame and a portion of the face of said first panel; and said sealant further being bonded to and extending along the edge of said first panel;

the frame member, first glass panel, and sealant forming a subassembly;

at least a portion of said extension being removable;

said sealant sealingly receiving the edge of the second glass panel.

5. The invention as defined in claim 4 wherein said sealant is of nonuniform thickness along the edge of the panel.

6. The invention as defined in claim 4 and further including a third and fourth glass panels, said first and third glass panels adapted to be secured to opposite sides of the same frame member;

each of said first and third panels bonded to opposite sides of said first frame member; and said second and fourth panels to be secured in edge-to-edge sealed relationship with said first and third panels, respectively.

7. The invention as defined in claim 6 wherein said frame includes two of said extensions and two of said cavities into which sealant may be flowed and thereafter hardened to bond the face and edge of the first and third panels to the frame.

8. The invention as defined in claim 7 wherein at least a portion of each of said extensions is removable.

9. A glazed wall system comprising:

at least one glass panel;

at least one frame member having an extension, said one frame member, said extension and said one glass panel being arranged to form a cavity;

said frame member bonded by a sealant flowed into said cavity to the face of said glass panel adjacent one edge thereof;

said sealant extending in said channel from the face of said glass panel to the edge of the glass panel; and at least a portion of said extension being removable.

10. The invention as defined in claim 9 and further including a second frame member bonded with a sealant to and along the face of the glass panel adjacent the opposite edge thereof.

11. The invention as defined in claim 9 wherein said sealant is of non-uniform thickness along said one edge of the glass panel.

12. The invention as defined in claim 9 including at least three frame members and at least two glass panels, said first and second frame members bonded to one of said glass panels and the third frame member bonded to the second glass panel.

* * * * *